US008638820B2

United States Patent
Shaffer et al.

(10) Patent No.: US 8,638,820 B2
(45) Date of Patent: Jan. 28, 2014

(54) IN-VOICEMAIL-SESSION CALL TRANSFERS

(75) Inventors: Shmuel Shaffer, Palo Alto, CA (US); Amit Barave, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 346 days.

(21) Appl. No.: 13/032,346

(22) Filed: Feb. 22, 2011

(65) Prior Publication Data

US 2012/0213219 A1 Aug. 23, 2012

(51) Int. Cl.
*H04J 1/02* (2006.01)
*H04M 11/00* (2006.01)
*H04M 1/64* (2006.01)

(52) U.S. Cl.
USPC ........ 370/493; 370/494; 370/495; 379/88.18; 379/88.22; 379/88.25; 379/211.02

(58) Field of Classification Search
USPC .................. 370/493–495; 379/69, 70, 80, 82, 379/88.16, 88.18, 88.22–88.26, 142.07, 379/211.02–211.04
See application file for complete search history.

(56) References Cited

U.S. PATENT DOCUMENTS

| 7,760,860 | B2 | 7/2010 | Adamczyk et al. | |
| 2004/0037402 | A1 | 2/2004 | Adamczyk et al. | |
| 2008/0187113 | A1* | 8/2008 | Adamczyk et al. | 379/88.23 |
| 2010/0054433 | A1* | 3/2010 | Gustave et al. | 379/88.23 |
| 2012/0213219 | A1* | 8/2012 | Shaffer et al. | 370/352 |

OTHER PUBLICATIONS

International Telecommunications Union (ITU); Series H: H.323, Dec. 2009, Audiovisual and Multimedia Systems; Pocket-Based Multimedia Communications Systems, 320 pgs.
International Telecommunications Union (ITU); Series X: X-509, Aug. 2005, Data Networks Open System Communications and Security; 174 pgs.

* cited by examiner

*Primary Examiner* — Benjamin H Elliott, IV
(74) *Attorney, Agent, or Firm* — Brinks Gilson & Lione

(57) ABSTRACT

In one embodiment, a voicemail system stores a voicemail message left by a first caller for a second caller. The voicemail system facilitates the transfer of a call out of a playback of the voicemail to the first caller and generates a credential that is coupled with the call. If the first caller is not available for the call, the second caller is transferred to the voicemail mailbox of the first caller where second caller records a second voicemail, which is placed in the mailbox of the first caller. The call may be transferred back to the mailbox of the first caller in response to a transfer code entered by the second caller. The voicemail system verifies the second caller based on the credential and returns the second caller to the appropriate location in the queue of voicemails.

20 Claims, 7 Drawing Sheets

IN-VOICEMAIL-SESSION CALL TRANSFERS

FIELD

The present disclosure relates generally to the field of communications systems.

BACKGROUND

A voicemail system provides a caller with the opportunity to leave a message when the called party is on another call, absent, or otherwise unavailable. The called party listens to the stored message, and the voicemail system provides a variety of services to the called party. The ability of the voicemail system to provide services in a manner acceptable to the user is inversely proportional to the number of inputs required by the user. If a service may be achieved by pressing one button, the system is better than another system that requires pressing two buttons to access the same service. In some situations, reducing the number of keystrokes improves the safety of user. One example is a mobile phone user who is simultaneously operating a motor vehicle while interacting with a voicemail system or crossing a street while interacting with a voicemail system.

In particular, when a called party chooses to return a calling party's call, the voicemail system may facilitate a call back feature, which can be invoked by a few key strokes. However, the call to the calling party takes the caller out of the mailbox of the calling party and disrupts the sequence of the series of messages waiting for the called party. Further, returning to the voicemail system requires the voicemail system to authenticate the called party again.

DETAILED DESCRIPTION

Overview

Figure 1:
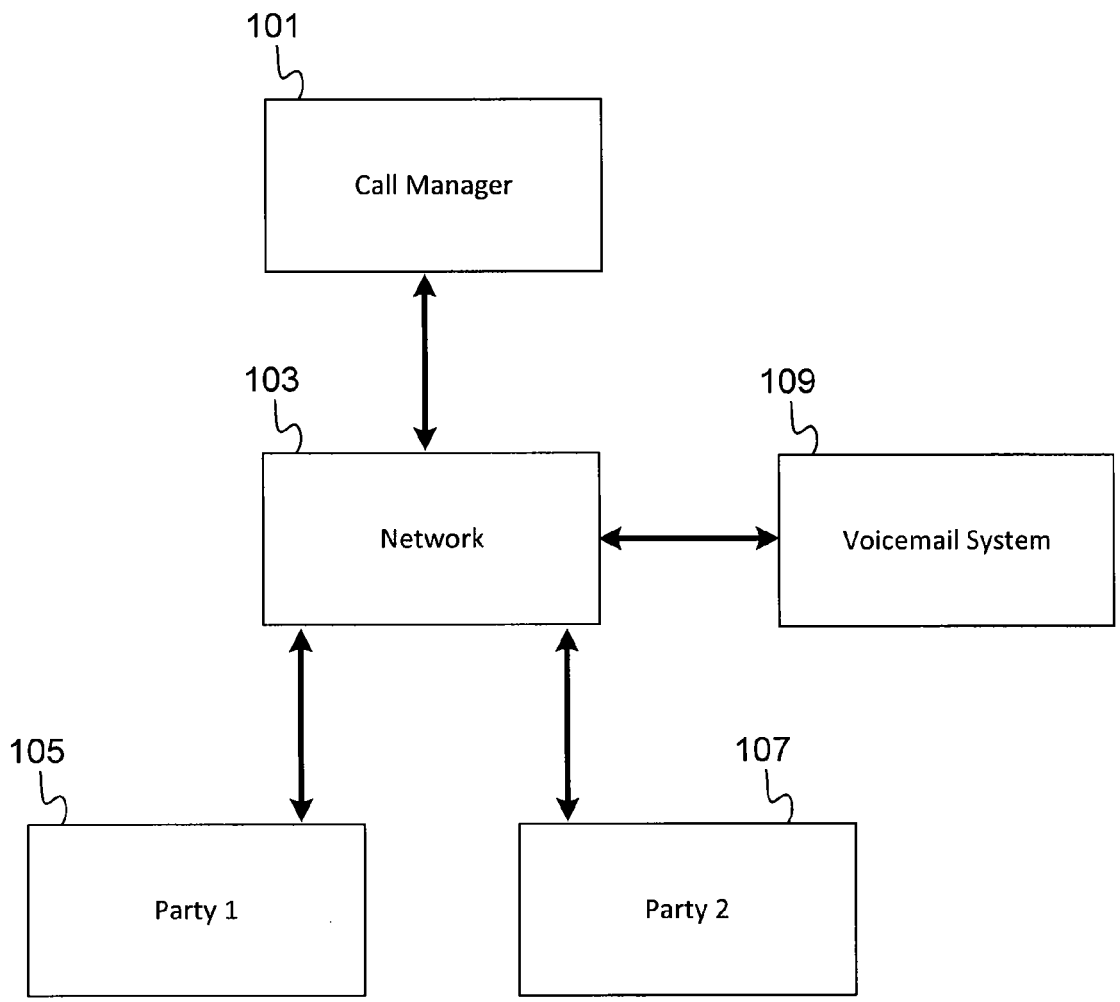
FIG. 1 illustrates an example system for voicemail session call transfers within a communication system.

In voicemail, call transfers are made from one mailbox to another mailbox and in return, or from one voicemail system to another voicemail system and in return, using transfer commands placed within the authenticated voicemail system. No additional call session or authentication is necessary. The transfer may be facilitated by a session credential that authenticates the return transfer to the original mailbox or voicemail system.

In one aspect, a method includes storing a voicemail message originating with a first party, initiating an authenticated voicemail session in response to receipt of a request from a second party, and accessing the voicemail message based on the request from the second party. The method further includes receiving a transfer code indicative of a transfer request initiated by the second party, generating a credential that is associated with the second party, connecting the authenticated voicemail session as a call session coupled with the credential for receipt by the first party, receiving the credential, and resuming the authenticated voicemail session based on authentication of the credential.

In a second aspect, a voicemail system includes a storage medium, a voicemail manager, a credential generator, and a credential authenticator. The storage medium is configured to store a voicemail message including digital data indicative of a message originated from a first party. The voicemail manager is configured to initiate an authenticated voicemail session, the authenticated voicemail session initiated in response to receipt of a request received from a second party, and the voicemail manager is further configured to access the voicemail message from the storage medium based on the request, and receive a transfer code indicative of a transfer request initiated by the second party. The credential generator is configured to generate a credential associated with the second party in response to receipt of the transfer code, wherein the authenticated voicemail session is transferred as a call session coupled with the credential for receipt by the first party. The credential authenticator is configured to receive the credential from the first party and authenticate the credential, wherein the voicemail manager returns to the authenticated voicemail session based on input from the credential authenticator.

In a third aspect, one or more non-transitory computer readable storage media encoded with software comprising computer executable instructions and when the software is executed, configured to store a voicemail message originating with a first party in a second party mailbox, initiate an authenticated voicemail session associated with a request from a second party to access the second party mailbox, receive a first transfer code from the second party, connect the authenticated voicemail session as a call session to the first party and to a first party mailbox if the first party is unavailable, receive a second transfer code from the second party, and resume the authenticated voicemail session with the second party mailbox based on second transfer code.

Example Embodiments

In many voicemail systems, a transfer to caller feature is available. The transfer to caller feature may be activated using a command with dual-tone multi-frequency (DTMF) signaling, such as *4, 44, or any touch tone code or another type of code. For example, a user, in the process of listening to a stored voicemail message (first voicemail message), presses the transfer caller command to initiate a call transfer to the person or extension that left the first voicemail message. In doing so, the user checking his voicemail exits the voicemail session. If the person or extension who left the first voicemail message is busy, absent, or otherwise unavailable, a second voicemail message may be left in return in the mailbox or voicemail system of the person or extension who left the first voicemail message However, when the user finishes leaving the second voicemail message, the user must hang up and initiate a new session with the user's voicemail system to continue checking voicemail messages or otherwise be authenticated again into the voicemail system to continue checking voicemail messages.

FIG. 1 illustrates an example system for voicemail session call transfers that do not require reauthentication or another call into the voicemail message system (VMS). The system for voicemail session call transfers shown in FIG. 1 includes a call manager 101, a network 103, and a voicemail system 109. The network 103 may be a local area network. The network 103 connects or facilitates connectivity of one or more callers to the call manager 101 and the voicemail system 109. It should be noted that although the call manager 101 and voicemail system 109 are depicted as a single box, those skilled in the art should understand that either single systems or a plurality of call manager and/or voicemail systems located in different geographical locations or collocated may be used. FIG. 1 illustrates a first party 105 and a second party 107. In this embodiment, the first party 105 and the second party 107 have mailboxes on the same voicemail system 109. The term "party" includes any one of a user, a computer, or a telephone or a combination thereof. The telephone or computer may be embodied as a server, a personal computer, a tablet computer, a smartphone, a personal digital assistant, or any device capable of initiating communication sessions.

The first party 105 and the second party 107 may communicate or interact with the system for voicemail session call transfers in a variety of ways. For example, the call manager may utilize voice grade telephone service such as the plain old telephone system (POTS), fiber optic communication, or voice over internet protocol (VoIP) using one or more protocols such as ITU-T recommendation H.323 published December 2009, session initiation protocol (SIP), real time transport protocol (RTP), session description protocol (SDP), and/or any other suitable proprietary or standard protocol.

The call manager 101 manages calls in the network 103. A call is a communication session between two or more parties, computers, or nodes. One type of communication session is a voicemail session. The call manager 101 may be implemented as part of a unified communication system or a public branch exchange (PBX). The call manager 101 facilitates calls to the voicemail system 109. The call manager 101 may transfer calls to the voicemail system 109 after a certain number of rings or if a predetermined time period passes without the called party answering. It should be noted that users may configure preferences to transfer all incoming calls directly to a voicemail mailbox. For example, the first party 105 may attempt to initiate a communication session with the second party 107. If the second party 107 is busy, absent, or otherwise unavailable, the call manager 101 transfers the communication session to the voicemail system 109. If the first party 107 chooses to leave a voicemail message, the voicemail message is stored by the voicemail system 109 in the mailbox of the second party 107. For example, the voicemail system 109 may store the voicemail message as digital data indicative of a multimodal (e.g., one or more of voice, video, text) message originated from the first party 107.

Subsequently, the second party 107 is notified by the voicemail system 109 that the voicemail message is stored and waiting. The notification may be a light, an email, a ring, or another form of notification. To access the message, the second party initiates an authenticated voicemail session. The authentication may be manual (e.g., through dialing a PIN or password) or automatic (e.g., by virtue of an extension number or caller ID). The voicemail system 109 accesses the voicemail message based on the request from the second party 107 and plays the voicemail message for the second party 107. The voicemail message may be one of several stored voicemail messages waiting in the mailbox of the second party 107.

The second party 107 may listen to the voicemail and wish to talk in real-time with the originating first party 105. Accordingly, the second party 107 inputs a transfer code (e.g., *4, 45, etc.), resulting in a transfer code signal or sequence being sent to the voicemail system 109. In response, the voicemail system 109 generates a credential associated with the second party 109. The credential may be a code, an alphanumeric value, an encryption key, or anything which can uniquely identify the second party 107. The credential may be generated based on the user ID of second party 109. Upon receiving the transfer code from the second party, the voicemail system 109 transfers the authenticated voicemail session as a call session coupled with the credential to the first party 105.

As a result the first party 105 is being alerted, e.g., via a ring tone, regarding the incoming call. If the first party 105 answers, a communication session is established. If the first party 105 is busy, absent, or otherwise unavailable, the call manager 101 transfers the call to the mailbox of the first party 105 in voicemail system 109. At this time, the second party 107 may leave a voicemail message for the first party 105, which the voicemail system 109 stores. The second party 107 may wish to return to the other unheard messages, and accordingly enter a second transfer code (e.g. *3, 45, etc.), resulting in a second transfer code signal or sequence sent to the voicemail system 109. In accordance with one example embodiment the call manager 101 transfers the communication session along with the credential to the voicemail system 109 based on the second transfer code.

In accordance with yet another embodiment when the mailboxes of first and second parties reside on the same mailbox, the call does not need to be transferred as the second party is already connected to voicemail 109. Rather, after verifying the credentials of the second party, the voicemail system returns the second party to its mailbox. The voicemail system 109 transfers the second party 107 into its mailbox in voicemail 109 without requiring it to go through the whole process of dialing into the voicemail system and getting authenticated.

The credential may be a session identifier that identifies the transfer of the communication session from the voicemail system or mailbox of the second party 107 to the voicemail system or mailbox of the first party 105. That is, the credential may be a flag that identifies the fact that the second party 107 is responding to message left by the first party 105 and that the second party 107 has already been authenticated by the voicemail system 109. The voicemail system 109 resumes the communication session based at least in part on authentication of the credential. Upon returning to its mailbox, the second party 107 may return to listening to the other stored voicemails.

The credential may be a temporary credential generated for a number of instances. For example, the temporary credential may expire after a single instance (single usage). In the example above, the temporary credential may be generated from a combination of the identity of the first party 105 and the second party 107. The respective identities may be based on the usernames of the parties, the IP addresses of the computers or telephones, the phone numbers or extensions of the parties, or any combination thereof. In addition, the temporary credential may be generated from a timestamp. The timestamp may be associated with the time of the original voicemail from the first party 105 to the second party 107, the time of the voicemail session initiated by the second party 107, or the time of the transfer of the communication session from voicemail to the first party 107. The temporary credential may expire after a predetermined time period measured from the timestamp. The predetermined time period may be any numbers of minutes, hours or days (e.g., 10 minutes, 15 minutes, 1 hour, 10 days, etc.).

The voicemail system 109 may allow a party recording a voicemail to indicate the voicemail as urgent. For example, the party may enter a command such as a DTMF code. The voicemail system 109 may also allow another indicator of urgency (e.g. an urgent response indicator or a reply response indicator). For example, as discussed above, the voicemail system 109 identifies from the credential that a voicemail message left by the second party 107 is in response to a message left by the first party 105. In addition or in the alternative, the voicemail system 109 may also determine that a voicemail message left by the second party 107 is in response to a message left by the first party 105 using a call history recorded by the call manager 101 or from the credentials associated with the call.

The reply response indicator communicates to the first party 105 that the stored voicemail message is in response to a voicemail left by the first party 105. The voicemail system 109 may place the voicemail message in the top of the queue of voicemail messages stored for the first party 105 based on the reply response indicator. When the first party 105 accesses its voicemail mailbox, the voicemail system 109 may prompt the first party 105 with a prompt: "you have one message from a caller you have been trying to reach" or "a message in response to your message to extension 1234 is waiting" or a similar prompt. The prompt may include time information from one or both voicemails and the user name of the second party 107.

The credential may also include a time marker to indicate a midpoint in the message and which message was the second party listening to when it invoked the transfer to caller feature. The time marker may be generated by the voicemail system 109 along with the credential when the transfer code is received from the called party (second party). When the voicemail system 109 later receives the credential, the time marker is also received, such as being retrieved from the credential so that the voicemail system 109 can resume the authenticated voicemail session at the midpoint indicated by the time marker. Alternatively, the time marker may indicate only which message was playing when the call was transferred. In this scenario, the voicemail system 109 resumes the authenticated voicemail session at the next voicemail message. In accordance with yet another embodiment the pointer to the last message to which the second party 107 listened is stored in the mailbox of the second caller in voicemail 109.

In another embodiment, in which the first party 105 and the second party 107 have mailboxes on the same voicemail system 109, the voicemail system 109 generates the credential as a flag that indicates that the authenticated voicemail session was initiated by the request from the second party system and that the second party has already been identified and authenticated by the voicemail system. Instead, the voicemail system 109 relies on the fact that the second party 107 must have been authenticated to access the mailbox of the second party, and therefore, automatically resumes the authenticated voicemail session based on a second transfer code after receiving the second transfer code from the second party.

Figure 2:
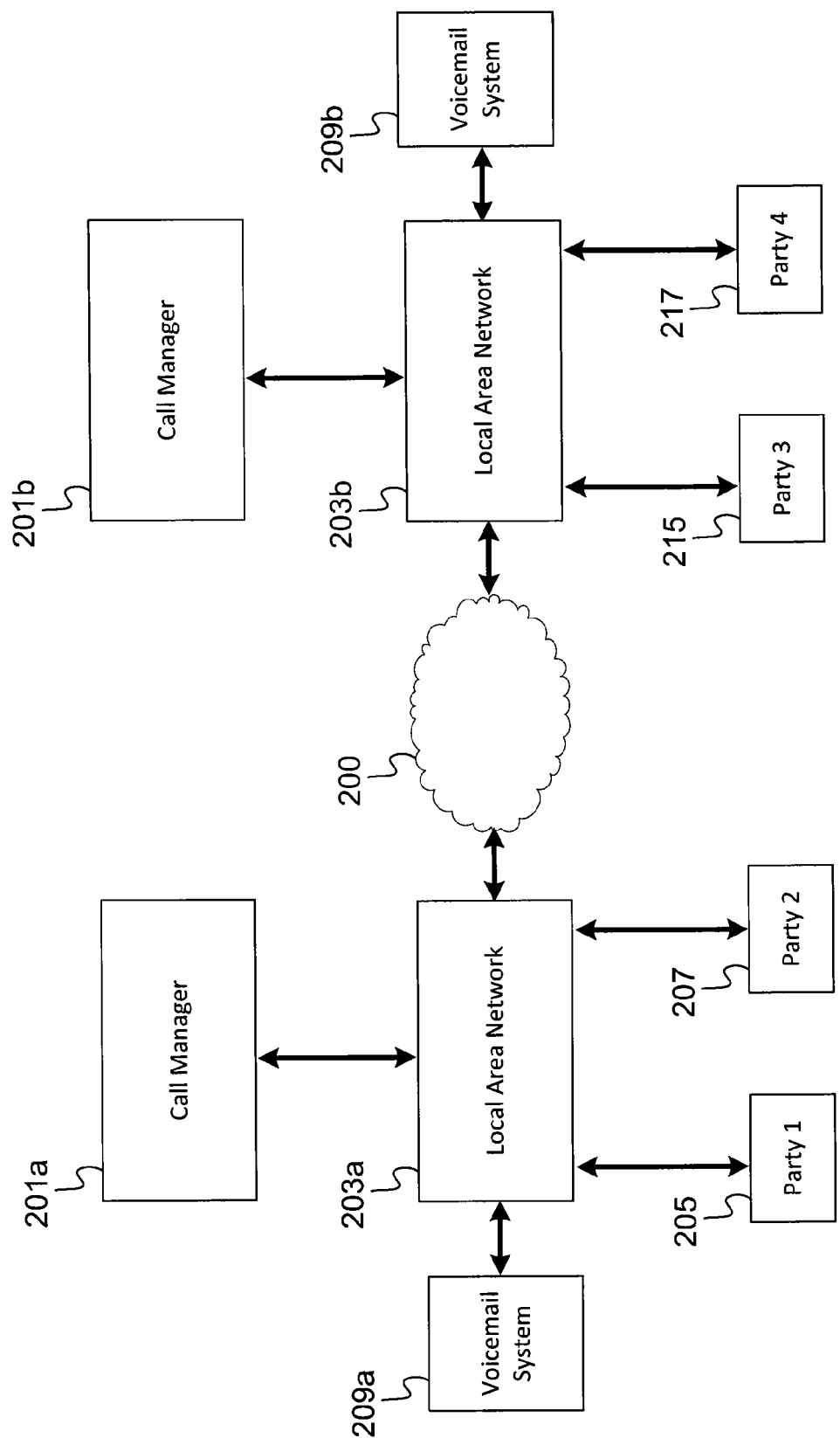
FIG. 2 illustrates an example system for voicemail session call transfers between two or more communication systems.

FIG. 2 illustrates an example system for voicemail session call transfers between two or more communication systems. Any features discussed with respect to FIG. 2 may be included with the system of FIG. 1, and any features discussed with respect to FIG. 1 may be included with the system of FIG. 2. A first communication system includes a call manager 201a, a local area network 203a, and a voicemail system 209a. The local network 203a facilitates communication between the communication system and a first party 205 and/or a second party 207. Similarly, a second communication system includes a call manager 201b, a local area network 203b, and a voicemail system 209b.

The local network 203b facilitates communication between the communication system and a third party 215 and/or a fourth party 217. The first communication system and the second communication system are connected via network 200, which may be the Internet, the public switched telephone network (PSTN), wide area network (WAN), or another network. The network 200 facilitates communication between the first and second communication systems and amongst first party 205 and/or a second party 207 and/or third party 215 and/or a fourth party 217.

Each of the first communication system and the second communication system are configured to receive a call transferred from either voicemail system 209a or 209b along with an authenticating credential, store a second voicemail, and return the call to the other of voicemail system 209a or 209b using the authenticating credential, in a manner similar to that discussed above.

Further, the first communication system and the second communication system may be digital or analog. Various protocols may be used for separate voicemail systems to communicate. For example, the audio message interchange specification (AMIS) provides for communication between different voicemail systems. Using, AMIS the voicemail systems can transmit voicemail messages between one another. Control commands transmit the envelope information, which may include fields such as to, from, time, and phone number. For example in the analog version of the protocol, control commands are converted to DTMF tones sent from one voicemail system and received by the other voicemail system. The message portion of the voicemail is played by one voicemail system and received and recorded by the other voicemail system.

For example, suppose party 205 initiates a call session with party 217, but party 217 is unavailable so the party 205 leaves a first voicemail, which is stored by the voicemail system 209b. The party 217 is informed of the first voicemail and initiates an authenticated session with its mailbox in voicemail 209b. The voicemail session may be authenticated using a login and/or password or automatically through a secure connection to the voicemail system 209b. The voicemail system 209b accesses the voicemail message from storage based on the request from party 217 and plays the voicemail. During, before or after the voicemail plays, the party 217 invokes the transfer feature by entering the transfer code to be transferred to the first party 205 who left the voicemail.

The voicemail system 209b or call manager 201b generates a credential associated with the party 217. The credential may be a code generated based on identification of the first party 205 and the party 217. The credential may be a temporary credential set to expire based on time or the number of usages. The voicemail system 209b transfers the authenticated voicemail session as a call session coupled with the credential to the first party 205 in the first communication system.

The first communication system rings or otherwise connects the call session to the first party 205. If the first party 205 does not answer after a predetermined number of rings or a predetermined amount of time, the call manager 201a transfers the call to the voicemail system 209a. If the party 217 elects to leave a voicemail message for the party 205, the voicemail system 209a stores a second voicemail message in the mailbox on the first party 205 in voicemail 209a. The party 217 may enter a return code (second transfer code) during, after, or in lieu of leaving the second voicemail message. In response to the return code, the voicemail system 209a, transfers the call session coupled with the credential to the voicemail system 209b. The voicemail system 209b receives the credential from voicemail system 209a on behalf of the party 217, and resumes the call session between the party 217 and the voicemail system 209b based on authentication of the credential. As a result the party 217 is transferred into the mailbox of party 217 on voicemail system 209*b* without needing to dial the access number of the voicemail system and without having to authenticate.

The control messages between voicemails 209*a* and 209*b* may include a link to the first voicemail message. For example, when the second voicemail is played, the voicemail system 209*a* may provide an option for accessing the first voicemail message for context or to refresh the memory of the user. The voicemail message may also provide a link with the second voicemail, such as "this message is in response to an original message press 77 to hear the original message." The link may also include timestamp information for one or both of the voicemails. It should be noted that by the time the first party wants to hear the original message, the second party may have already deleted it and as such the feature may not be available. Also, under some security configuration the second voicemail system 209*b* may prohibit the first party 205 from accessing messages/mailboxes on voicemail 209*b*.

Figure 3:
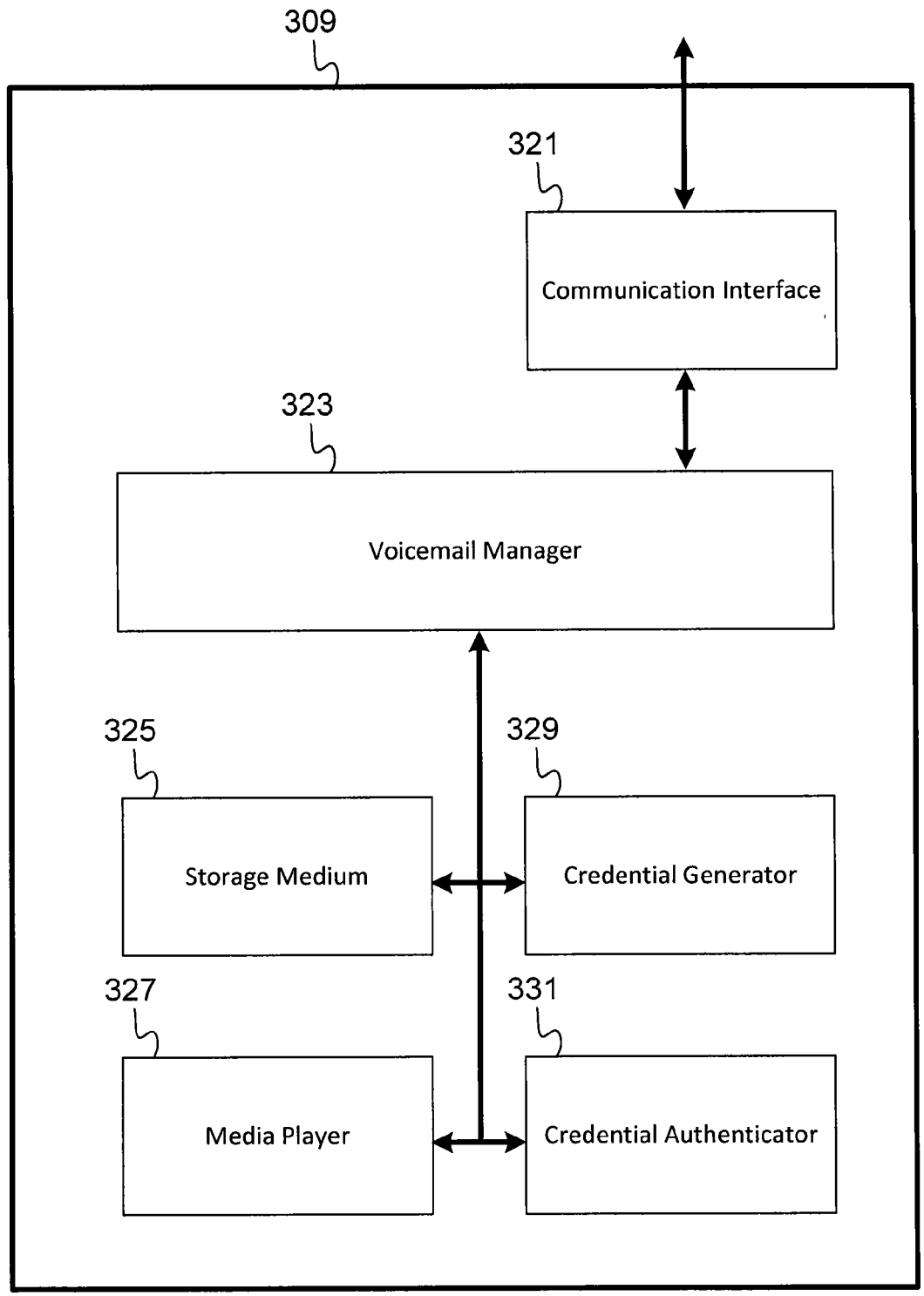
FIG. 3 illustrates an example functional block diagram of a voicemail system according to FIG. 1 or FIG. 2.

FIG. 3 illustrates an example functional block diagram 309 of a voicemail system 109, 209*a*, or 209*b*. The functional block diagram 309 includes a communication interface 321, a voicemail manager 323, a storage medium 325, a media player 327, a credential generator 329, and a credential authenticator 331. In other examples, portions of the voicemail system may reside in the call manager or elsewhere within the system. In addition, in other examples, fewer or additional blocks may be used to describe the system.

The storage medium 325 stores a voicemail originating with a first party. The voicemail may include an envelope portion and a message portion. The message portion may be digitized audio (e.g. voice). The storage medium 325 may be a hard disk or other magnetic media, a memory card or other solid state media, which may be located external or internal to the voicemail system. The storage medium may be a means for storing voicemails.

The voicemail manager 323, the media player 327, the credential generator 329, and the credential authenticator 331 may be embodied by a microprocessor executing several sets of instructions. The voicemail manager 323 may correspond to a means for managing voicemail embodied as a set of instructions executed by the microprocessor. The media player 327 may correspond to a means for playing voicemail embodied as a set of instructions executed by the microprocessor. The credential generator 329 may correspond to a means for generating a credential embodied as a set of instructions executed by the microprocessor. The credential authenticator 331 may corresponds to a means for authenticating the credential embodied as a set of instructions executed by the microprocessor.

The voicemail manager 323 initiates an authenticated voicemail session associated with a request to play voicemails from a second party. The voicemail manager 323 accesses one or more stored voicemails from the storage medium. At some point during the authenticated voicemail session, the second party decides to be connected with one of the callers who left one of the stored voicemails. For example, the second party may wish to be connected with the first party. To invoke this feature, the second party may input the transfer code to the voicemail system before, while, or after the voicemail message from the first party is playing.

The credential generator 329 is configured to generate a credential associated with the party being transferred (second party) by the voicemail manager 323. The credential may also be associated with the original caller (first party) and/or include a timestamp. Any secure method may be used to generate the credential. For example, an x.509 certificate may be used as a cryptographic credential. Alternatively, any code, alphanumeric value, encryption key, or other unique identifier may be used for the credential. The voicemail manager 323 transfers the authenticated voicemail session coupled with the credential as a call session to the original caller (first party).

The second party may now be connected live to the first party or if the first party in not available the call may be forwarded into the voicemail mailbox or voicemail system of the first party. While in the mailbox or voicemail system of the first party, the second party may enter a second transfer code to return to the mailbox or voicemail system of the second party. In response to the second transfer code, the first voicemail system transfers the call to the second voicemail message and automatically identifies and authenticates the second caller using the original credential or certificate. The credential authenticator 331 receives the credential from the voicemail system or call manager of the first party and authenticates the credential. The credential authenticator 331 issues either a confirmed command or a denied command to the voicemail manager 323. If the voicemail manager 323 receives the confirmed command, the voicemail manager 323 connects the second party into its voicemail mailbox. If the voicemail manager 323 received the denied command, the voicemail manager 323 drops the session, instructs the call manager to drop the session, or repeats the authentication process for redundancy.

Figure 4:
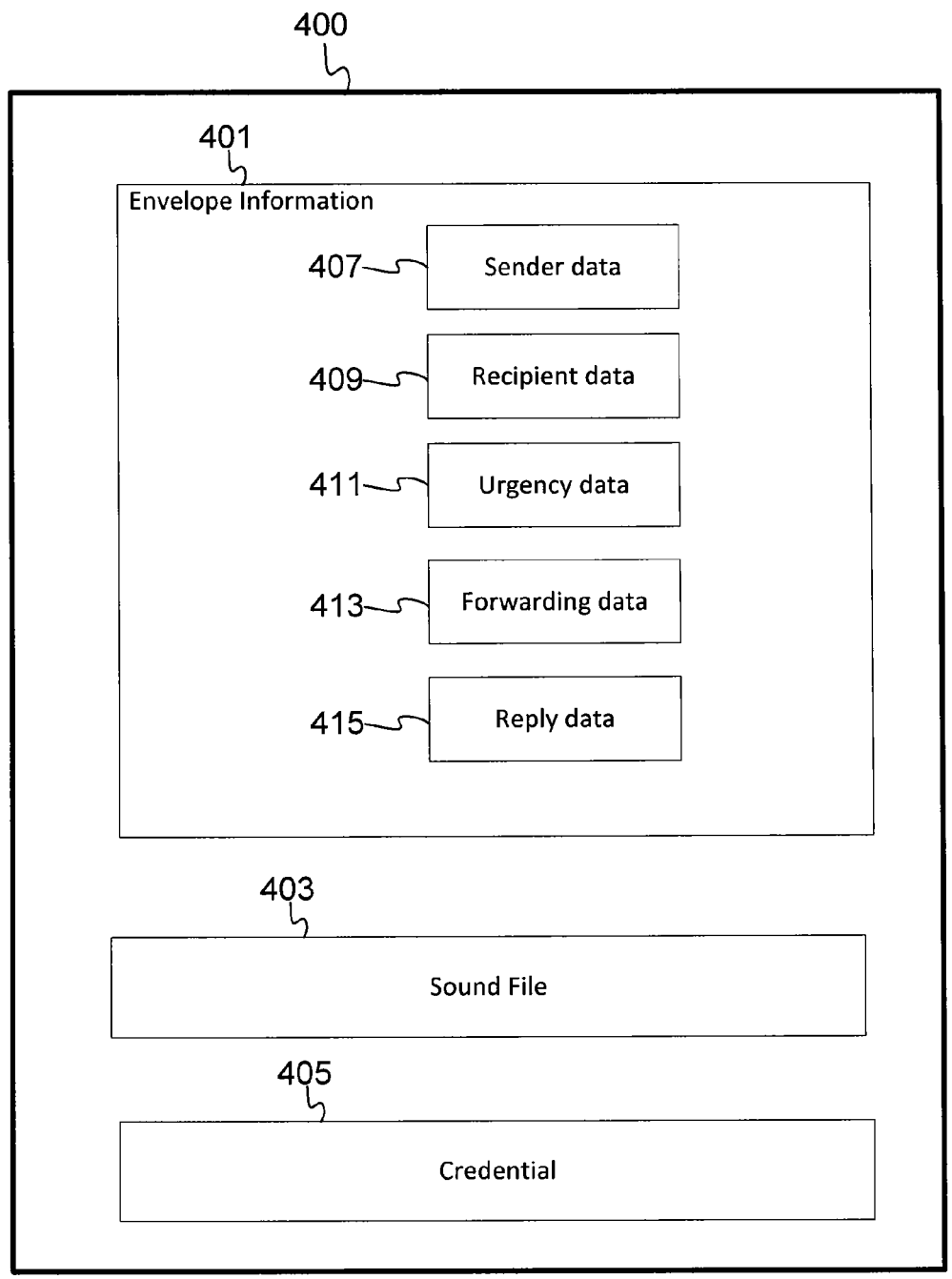
FIG. 4 illustrates a voicemail message.

FIG. 4 illustrates a voicemail message 400. The voicemail message includes enveloper information 401, a sound file 403, and a credential 405. The credential 405 is coupled to the voicemail message 400. The term "coupled to" means that the credential 405 is included within, transmitted together, or otherwise associated with the voicemail message 400.

The envelope information 401 includes sender data 407, recipient data 409, urgency data 411, forwarding data 413, and reply data 415. The envelope information 401 may be display or audibly played for the user at the beginning of a voicemail. The sender data 407 identifies the party who left the voicemail message by username, IP address, or extension. Similarly, the recipient data 409 identifies the recipient of the voicemail message by username, IP address, or extension. The forwarding data 413 indicates whether the voicemail has been forwarded. The forwarding data 413 may include the envelope information of the originating voicemail. In other examples, any other levels of urgency may also be included.

The urgency data 411 indicates whether the voicemail message is urgent. For example, the calling party may set the voicemail message as urgent through entering a code or sequence when recording the voicemail message so that the voicemail system identifies the message as urgent through a special ring or notification. The reply data 415 may be set automatically by the voicemail system when the voicemail message was left in the mailbox by a second party in response to another voicemail. The voicemail system may read the reply data 415 and notify the user that the voicemail message is in response to an earlier voicemail message left by the user or automatically place the voicemail in the top of the queue of stored messages.

The sound file 403 is the recorded body of the voicemail message. The sound file 403 may be digitized and/or compressed voice. The sound file 403 may be in any format such as ITU-T G.711, G.723, G.729, RealAudio, ALAC, or another format. The credential 405 may be a code, an alphanumeric value, an encryption key, or a public key certificate such as X.509. For example, the Public-key and attribute certificate frameworks defined by ITU-T Recommendation X.509 and published August 2005 or November 2008. In the case where the parties are on the same voicemail system, the credential may be a flag indicated by a bit or a series of bits in a control message of the call that indicates that the voicemail session was initiated by a particular party that has already been authenticated.

Figure 5:
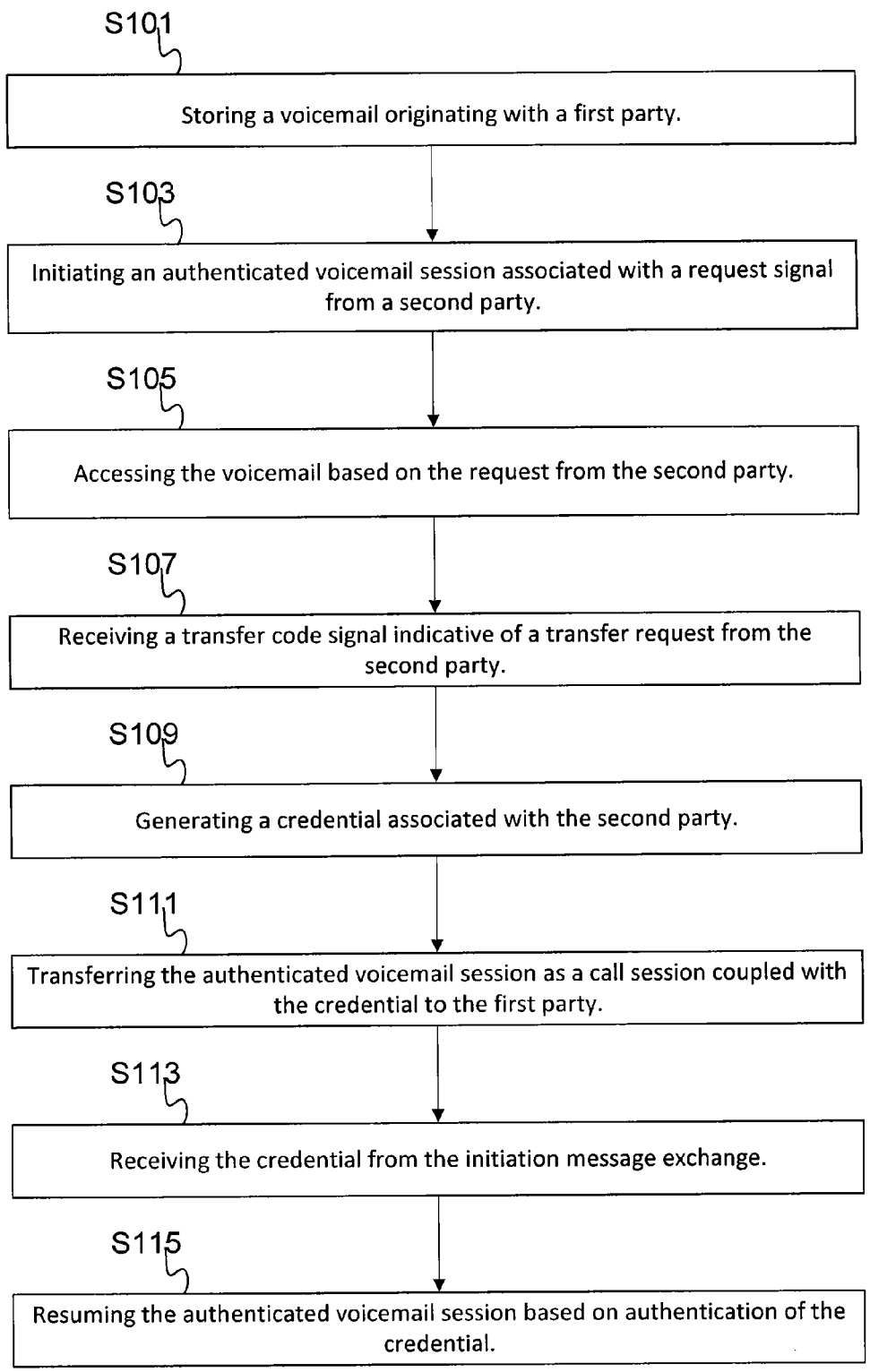
FIG. 5 illustrates a flow chart for voicemail session call transfers.

FIG. 5 illustrates a flow chart voicemail session call transfers. At act S101, a first voicemail left by a first party is stored in a memory of the mailbox or voicemail system of a second party. The voicemail message may be one of a plurality of voicemail messages for a second party that are index and stored according to order of receipt. At act S103 the voicemail system receives a signal or message generated based on a request from the second party to play the messages. The request may be part of an authenticated voicemail session. The request may be a command entered by the second party or the request may be automatic by virtue of calling in to the voicemail system. The authentication may be manual, requiring the second party to enter a code, or automatic because the terminal used by the second party may be identified. The terminal may be a telephone, a standalone VoIP phone, a soft VoIP phone, or a computer.

At act S105, the voicemail system accesses the first voicemail message based on the request from the second party. At some point, the second party chooses to immediately respond to the voicemail and enters a first transfer code, which results in a first transfer code signal or sequence. At act S107, the voicemail system receives the first transfer code signal or request originating from the second party. At act S109, the voicemail system generates a credential associated with the second party. The credential may be generated from the username, IP address, encryption key, or using any information associated with the first party and/or the second party. At act S111, the voicemail system transfers the authenticated voicemail session as a call session coupled with the credential to the first party.

If the second party is connected live with the first party, the call session continues. If the second party is not connected live with the first party because the first party is unavailable, the call is forwarding to the first party's mailbox in the voicemail system. The second party may leave a voicemail for the first message. To be transferred back to the second party's mailbox, the second party enters a second transfer code, which results in the process of an authenticated transfer of the second party back to his voicemail mailbox. At act S113, the credential is received back from the initiation message exchange. At act S115, the voicemail system resumes the authenticated voicemail session based on authentication of the credential and the second party gains access to the voicemail mailbox without needing to redial into the voicemail system and key in his ID and authentication code.

Figure 6:
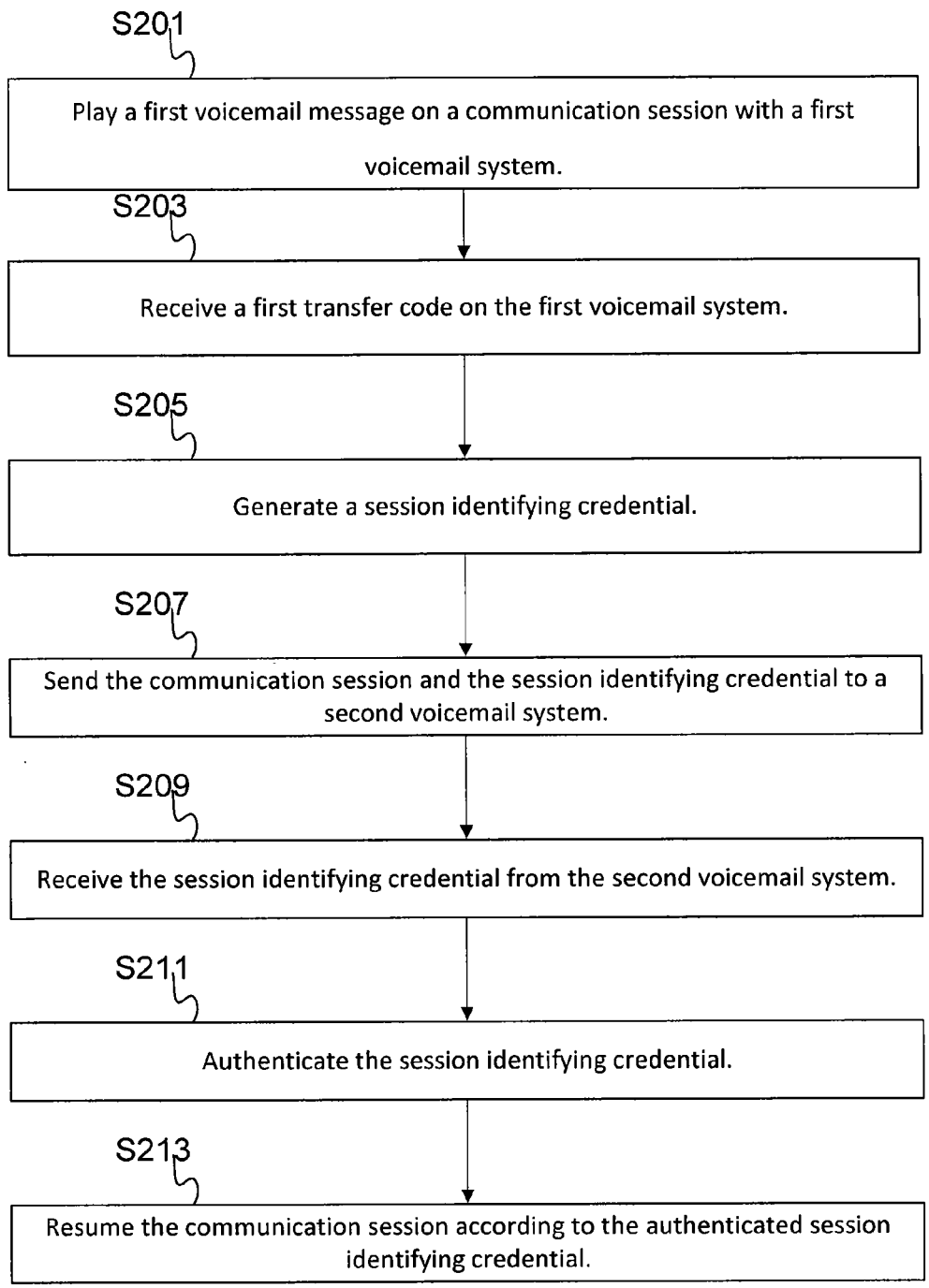
FIG. 6 illustrates a flow chart for voicemail session call transfers between two or more communication systems.

FIG. 6 illustrates a flow chart for voicemail session call transfers between two or more communication systems. At act S201, a first voicemail system plays a first voicemail message on a communication session. The user who initiates the communication session and is listening to a voicemail message chooses to invoke the feature of being transferred the caller who have left him the voicemail message. At act S203, the first voicemail system receives a first transfer code. The first transfer code may be entered by touch tones, entered into a keyboard, or spoken. At act S205, the first voicemail system generates a session identifying credential that identifies at least the user that initiated the communication session. The first voicemail system retains a copy of the session identifying credential and stores the credential in memory. At act S207, the first voicemail system transfers the communication session and the session identifying credential to a communication system having a second voicemail system.

Assuming the communication session does not reach a live caller, the second communication system transfers the incoming call to the voicemail mailbox or voicemail system of the called party. The voicemail system will permit the user who initiates the communication session to record a second voicemail message. During or after recording the voicemail, the user may chose to return to the first voicemail system. Accordingly, the user who initiates the communication session enters a second transfer code in a manner similar to the first transfer code. The second voicemail system transfers the communication session and the session identifying credential back to the communication system having the first voicemail system.

At act S209, the first voicemail system receives an incoming call with the session identifying credential, and at act S211, authenticates the session identifying credential. Authenticating the session identifying credential may involve matching the stored credential to the session identifying credential received from the second voicemail system. At S213, the first voicemail system establishes a communication session between the caller who initiated the first communication session and the voicemail system or voicemail mailbox of the caller, which may begin at substantially the same point as when the first transfer code received at S203.

Figure 7:
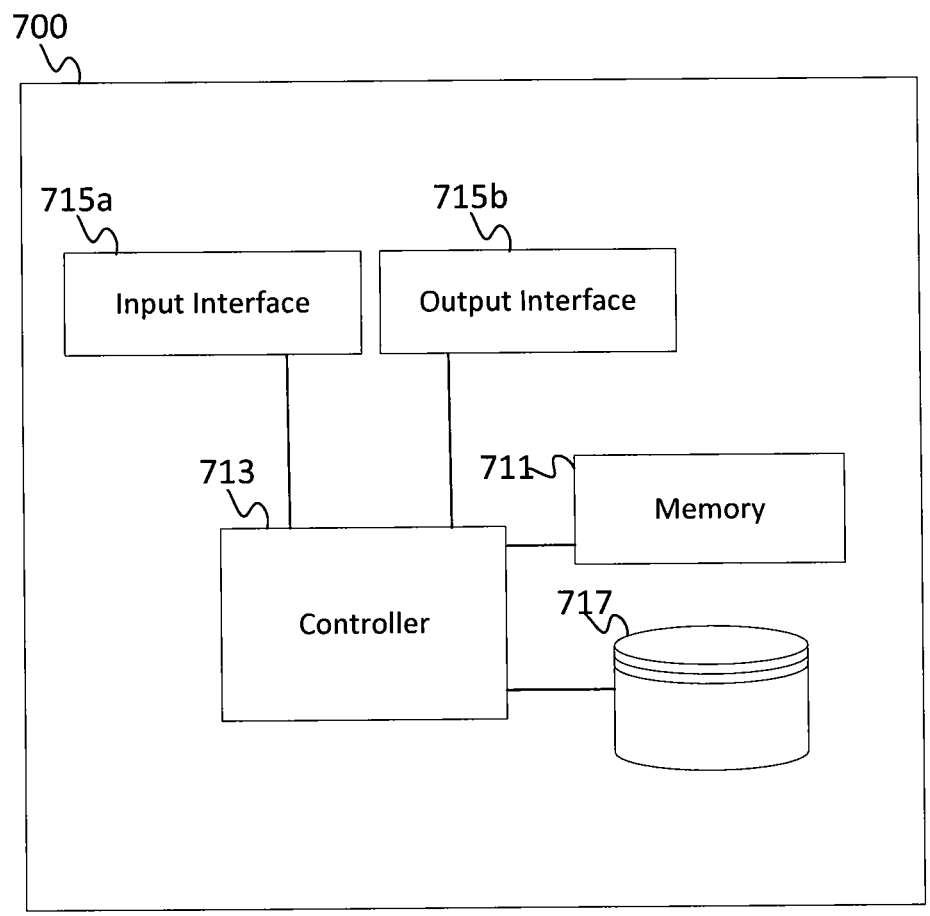
FIG. 7 illustrates an example structural block diagram of a voicemail system according to FIG. 1 or FIG. 2.

FIG. 7 illustrates an example structural block diagram of a voicemail system 109, 209a, or 209b. The voicemail system includes a memory 711, a controller 713, and an I/O interface 715. A database 717 may also be included. Additional, different, or fewer components may be provided.

The memory 711 may correspond to the storage medium 325 of FIG. 3. The memory 711 may be any known type of volatile memory, a non-volatile memory, or a combination of volatile and non-volatile memories. The memory 711 may include one or more of a read only memory (ROM), dynamic random access memory (DRAM), a static random access memory (SRAM), a programmable random access memory (PROM), a flash memory, an electronic erasable program read only memory (EEPROM), static random access memory (RAM), or other type of memory.

The memory 711 may store computer executable instructions for the algorithms discussed herein. The controller 713 may execute the computer executable instructions. The computer executable instructions may be included in computer code. The computer code may be stored in the memory 711. The computer code may be written in any computer language, such as C, C++, C#, Java, Pascal, Visual Basic, Perl, HyperText Markup Language (HTML), JavaScript, assembly language, extensible markup language (XML) and any combination thereof or any other suitable programming languages. The computer code is encoded in one or more tangible media or one or more non-transitory tangible media for execution by the controller 713.

The instructions may be stored on any computer readable medium. A computer readable medium may include, but is not limited to, a floppy disk, a hard disk, an application specific integrated circuit (ASIC), a compact disk CD, other optical medium, a random access memory (RAM), a read only memory (ROM), a memory chip or card, a memory stick, and other media from which a computer, a processor or other electronic device can read.

The controller 713 may perform the functions of the voicemail manager 323, the media player 327, the credential generator 329, and the credential authenticator 331 as discussed above. The controller 713 may include a general processor, digital signal processor, application specific integrated circuit, field programmable gate array, analog circuit, digital circuit, server processor, combinations thereof, or other now known or later developed processor. The controller 713 may be a single device or combinations of devices, such as associated with a network or distributed processing. Any of various processing strategies may be used, such as multi-processing, multi-tasking, parallel processing, remote processing, centralized processing or the like. The controller 713 may be responsive to or operable to execute instructions stored as part of software, hardware, integrated circuits, firmware, micro-code or the like. The functions, acts, methods or tasks illustrated in the figures or described herein may be performed by the controller 713 executing instructions stored in the memory 711. The functions, acts, methods or tasks are independent of the particular type of instructions set, storage media, processor or processing strategy and may be performed by software, hardware, integrated circuits, firmware, micro-code and the like, operating alone or in combination. The instructions are for implementing the processes, techniques, methods, or acts described herein.

The I/O interface 715 may include an input communication interface 715a and an output communication interface 715b. The I/O interface 715 is configured to establish connectivity with the call manager 101 and other communication system components such as other phones, Gateways (not shown), etc., over communication network 103. The I/O interface 715 may correspond to the communication interface 321 as discussed above.

The I/O interface(s) 715a-b may include any operable connection. An operable connection may be one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals or messages to each other or through one or more intermediate entities (e.g., processor, operating system, logic, software). Logical and/or physical communication channels may be used to create an operable connection. For example, the I/O interface(s) 715a-b may include a first communication interface devoted to sending data, packets, or datagrams and a second communication interface devoted to receiving data, packets, or datagrams. Alternatively, the I/O interface(s) 15a-b may be implemented using a single communication interface.

The communication links may be any protocol or physical connection that is used to couple a server to a computer. The communication paths may utilize Ethernet, wireless, transmission control protocol (TCP), Internet protocol (IP), or multiprotocol label switching (MPLS) technologies. As used herein, the phrases "in communication" and "coupled" are defined to mean directly connected to or indirectly connected through one or more intermediate components. Such intermediate components may include both hardware and software based components.

Those skilled in the art should recognize that first and second parties can be either associated with the same voicemail system or with two different voicemail systems. When the first and second parties are associated with the same voicemail system the call itself does not need to be transferred because the call in this case is a connection between the caller's phone and a port on the voicemail system. The "transfer" occurs inside the voicemail system but from a point of view of changing call-legs, there is no need for a transfer. However when the first and second parties are associated with two different voicemail systems, the call itself need to be transferred because the call in this case (which has on the one side connected with the phone of the caller) needs to be transferred from being connected to an I/O port on the voicemail system of first party to an I/O port on the voicemail of the second party (and back).

Accordingly, in the first scenario wherein the caller "stays" in the same voicemail system there is no need to generate credentials; the user have been already authenticated and the system may use a flag to indicate that the user has been already authenticated with this voicemail system. However, in the second when the user need to be transferred between two (or more) different voicemail systems the voicemail system needs to generate credentials which would be used to automatically authenticate the caller back into his own voicemail system and specifically into his own mailbox.

Although the embodiments above are described with reference to voicemail systems those skilled in the art would recognize that the features described above as well as the following claims equally apply to other messaging modalities such as voice, text, video, etc.

Various embodiments described herein can be used alone or in combination with one another. The foregoing detailed description has described only a few of the many possible implementations of the present disclosure. For this reason, this description of example embodiments is intended by way of illustration, and not by way of limitation.

We claim:

1. A method, comprising:
    storing a first voicemail message originating with a first party;
    storing a second voicemail message originating with a second party;
    initiating an authenticated voicemail session in response to receipt of a request from the second party;
    generating a credential that is associated with the second party;
    connecting the authenticated voicemail session as a call session coupled with the credential for receipt by the first party;
    and
    associating the second voicemail message with a reply response indicator based on the credential, wherein the reply response indicator indicates that the second voicemail message is in response to the first voicemail message.

2. The method of claim 1, wherein the first party is associated with a first communication system and the second party is associated with a second communication system.

3. The method of claim 2, wherein the second communication system transfers the call session coupled with the credential to the first communication system using voice over Internet protocol (VoIP).

4. The method of claim 1, wherein the first party is associated with a communication system and the second party is associated with the communication system.

5. The method of claim 4, wherein the credential is a flag that indicates that the authenticated voicemail session was initiated by the request from the second party, and wherein the call session coupled with the credential is internally connected to a mailbox of the first party within the communication system.

6. The method of claim 1, wherein the credential is a temporary credential that expires after a single instance of authentication or expires after a predetermined time period.

7. The method of claim 1, further comprising: inserting a link to the first voicemail message into the second voicemail message.

8. The method of claim 1, further comprising:
receiving a transfer code indicative of a transfer request initiated by the second party;
generating a time marker when the transfer code is received, wherein the credential includes the time marker and the authenticated voicemail session is resumed at a midpoint indicated by the time marker.

9. The method of claim 1, further comprising: resuming the authenticated voicemail session based on authentication of the credential.

10. The method of claim 1, further comprising: receiving a transfer code indicative of a transfer request initiated by the second party, wherein the credential is associated with the second party in response to receipt of the transfer code.

11. A voicemail system, comprising:
a storage medium configured to store a first voicemail message including digital data indicative of a message originated from a first party and store a second voicemail message including digital data indicative of a message originated from a second party, the second voicemail message associated with a reply response indicator based on a credential, wherein the reply response indicator indicates that the second voicemail message is in response to the first voicemail message; and
a microprocessor, the microprocessor including:
voicemail manager instructions executable by the microprocessor to initiate an authenticated voicemail session, the authenticated voicemail session initiated in response to receipt of a request received from the second party, the voicemail manager instructions further executable by the microprocessor to access the first voicemail message from the storage medium based on the request received from the second party;
credential generator instructions executable by the microprocessor to generate the credential, the credential being associated with the second party, wherein the authenticated voicemail session is transferred as a call session coupled with the credential for receipt by the first party; and
credential authenticator instructions executable by the microprocessor to receive the credential from the first party and authenticate the credential, wherein the voicemail manager instructions returns to the authenticated voicemail session based on input from the credential authenticator instructions.

12. The voicemail system of claim 11, wherein the second party is associated with a first communication system including the voicemail system and the first party is associated with a second communication system.

13. The voicemail system of claim 11, wherein the first party is associated with a communication system including the voicemail system and the second party is associated with the communication system.

14. The voicemail system of claim 11, wherein the credential is a temporary credential that expires after a single instance of authentication or expires after a predetermined amount of time.

15. The voicemail system of claim 11, wherein the voicemail manager instructions are further executable to insert a link to the first voicemail message into the second voicemail message.

16. The voicemail system of claim 11, wherein the voicemail manager instructions are further executable to:
receive a transfer code indicative of a transfer request initiated by the second party, wherein the credential is associated with the second party in response to receipt of the transfer code; and
insert a time marker into the credential when the transfer code is received from the second party.

17. One or more non-transitory computer readable storage media comprising computer executable instructions when executed operable to:
store a first voicemail message originating with a first party in a second party mailbox;
store a second voicemail message originating with a second party in a first party mailbox; and
associate the second voicemail message with a reply response indicator based on a credential associated with the second party, wherein the reply response indicator indicates that the second voicemail message is in response to the first voicemail message.

18. The one or more computer readable storage media of claim 17, further operable to:
initiate an authenticated voicemail session associated with a request from the second party to access the second party mailbox, based on the credential;
receive a first transfer code from the second party;
connect the authenticated voicemail session as a call session to the first party and to the first party mailbox if the first party is unavailable, the authenticated voicemail session connected as a call session based on the first transfer code and the reply response indicator;
receive a second transfer code from the second party; and
resume the authenticated voicemail session with the second party mailbox based on the second transfer code and the reply response indicator.

19. The one or more computer readable storage media of claim 17, wherein the first party is associated with a communication system and the second party is associated with the communication system, and wherein the credential is a flag that indicates that the authenticated voicemail session was initiated by a request from the second party.

20. The one or more computer readable storage media of claim 17, further operable to: generate a time marker when a transfer code is received from the second party, wherein the credential includes the time marker and the authenticated voicemail session is resumed at a midpoint indicated by the time marker.

* * * * *